United States Patent
Call et al.

(10) Patent No.: US 10,459,635 B2
(45) Date of Patent: Oct. 29, 2019

(54) WINDOW BASED MAPPING

(71) Applicant: SK Hynix Inc., Gyeonggi-do (KR)

(72) Inventors: Matthew Lewis Call, Longmont, CO (US); Frederick K. H. Lee, Mountain View, CA (US); Johnny Lam, Firestone, CO (US); Stephen Silva, Fort Collins, CO (US)

(73) Assignee: SK Hynix Inc., Gyeonggi-do (KR)

( * ) Notice: Subject to any disclaimer, the term of this patent is extended or adjusted under 35 U.S.C. 154(b) by 90 days.

(21) Appl. No.: 15/411,786

(22) Filed: Jan. 20, 2017

(65) Prior Publication Data
US 2017/0235488 A1 Aug. 17, 2017

Related U.S. Application Data

(60) Provisional application No. 62/294,253, filed on Feb. 11, 2016.

(51) Int. Cl.
*G06F 12/00* (2006.01)
*G06F 3/06* (2006.01)

(52) U.S. Cl.
CPC ............ *G06F 3/061* (2013.01); *G06F 3/0644* (2013.01); *G06F 3/0659* (2013.01); *G06F 3/0679* (2013.01)

(58) Field of Classification Search
CPC .... G06F 3/061; G06F 15/7821; G06F 3/0679; G06F 3/0655
See application file for complete search history.

(56) References Cited

U.S. PATENT DOCUMENTS

| | | | |
|---|---|---|---|
| 6,014,724 A | 7/2000 | Jenett | |
| 7,296,139 B1 * | 11/2007 | Case | G06F 12/0897 710/26 |
| 8,838,936 B1 | 9/2014 | Salessi et al. | |
| 2008/0183955 A1 | 7/2008 | Yang et al. | |
| 2009/0193184 A1 * | 7/2009 | Yu | G06F 12/0246 711/103 |
| 2014/0122781 A1 | 5/2014 | Smith | |
| 2014/0208003 A1 | 7/2014 | Cohen | |
| 2014/0331024 A1 * | 11/2014 | Wu | G06F 12/06 711/209 |
| 2017/0031615 A1 * | 2/2017 | Lee | G06F 11/1068 |

* cited by examiner

*Primary Examiner* — David Yi
*Assistant Examiner* — Alan Otto
(74) *Attorney, Agent, or Firm* — Kilpatrick Townsend & Stockton LLP

(57) ABSTRACT

Window based mapping is used to reduce the usage of volatile memory for storing the mapping of logical to physical addresses for accesses to data in a flash drive. Two separate mapping tables for translation of logical addresses to physical addresses (L2P), e.g., an L2P front map and an L2P back map, are used where the L2P front map acts as a window to the L2P back map. The L2P front map has smaller granularity for data accesses than the L2P back map. The data accessed using the L2P front map can allow the flash drive to function with relatively same performance as a fully mapped drive with a single mapping table.

20 Claims, 5 Drawing Sheets

| Mapping Configuration 402 | Calculated Memory Size 404 | Total Memory Size 406 |
|---|---|---|
| Full 4KB mapping | None | 9 GB |
| 8KB L2P back map, 2 windows (64GB) | 4.5GB + 144MB | 4.6 GB |
| 8KB L2P back map, 10 windows (128GB) | 4.5GB + 1.46GB | 6.0 GB |
| 16KB L2P back map, 10 windows (64GB) | 2.25GB + 720MB | 3.0 GB |
| 16KB L2P back map, 10 windows (128GB) | 2.25GB + 1.46GB | 4.7 GB |

FIG. 4

WINDOW BASED MAPPING

CROSS-REFERENCES TO RELATED APPLICATIONS

This application is a non-provisional application and claims the benefit and priority of U.S. Provisional Application No. 62/294,253, filed on Feb. 11, 2016, titled "WINDOW BASED FTL," which is herein incorporated by reference in its entirety for all purposes.

BACKGROUND OF THE INVENTION

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' (for example, NAND and NOR flash devices), are used in media storage, cameras, mobile phones, mobile computers, laptop computers, USB flash drives, etc. Non-volatile memory provides a relatively reliable, compact, cost-effective, and easily accessible method of storing data when the power is off.

Flash memory controllers are used to manage the data stored in the non-volatile memory, and to act as an interface between a host and the non-volatile memory. A flash memory controller can include a Flash Translation Layer (FTL) that maps the host side logical addresses such as "logical block addresses (LBAs)" to the flash memory side "physical addresses" which correspond to physical locations in the flash memory. The mapping between the logical addresses and the physical addresses can change during operating of the system for various reasons including flash management. During operation, the FTL may maintain mapping tables that enable the translation in volatile memory, such as Dynamic Random Accessible Memory (DRAM), inside or accessible to the controller.

An optimized solid state drive can use a full logical to physical (L2P) map of the flash memory data. For large capacity drives, the full L2P map may use a large amount of DRAM (or other system memory) to keep track of the associated map table. The large amount of DRAM can be difficult to manage and may not be cost effective.

BRIEF SUMMARY OF THE INVENTION

System and apparatus are described to provide window based flash translation layer using two separate maps implemented in a volatile memory that can allow different granularity into flash memory data. A logical address to physical address (L2P) front map may be a smaller map in size with a smaller granularity for the entries. An L2P back map can have larger granularity to provide reduction in the overall size of the volatile memory. The data accessed in the L2P front map can allow the flash drive to function with relatively same performance as a fully mapped drive. The L2P back map may require execution of a read-modify-write to the flash memory if the data written is smaller than the back L2P map.

In some embodiments, a flash memory device may comprise a flash memory, a volatile memory and a controller. The volatile memory can be configured to store a first logical address to physical address (L2P) map and a second L2P map, wherein a unit of data pointed to by the first L2P map is smaller than a unit of data pointed to by the second L2P map. The first L2P map represents a window of a certain contiguous range of logical addresses corresponding to the second L2P map. The flash memory comprises a plurality of flash memory blocks, wherein the first L2P map corresponds to a first set of flash memory blocks and the second L2P map corresponds to a second set of flash memory blocks from the plurality of flash memory blocks.

In some embodiments, the controller may be configured to receive an access request with a logical address for access to data on the flash memory, and determine whether the logical address of the access request falls within at least one of a plurality of windows. Each window may be a contiguous range of logical addresses. The controller may also be configured to use the first L2P map to translate the logical address to a physical address associated with the flash memory upon determining that the logical address of the access request falls within the at least one window of the plurality of windows. The controller may also be configured to use the second L2P map to translate the logical address to the physical address associated with the flash memory upon determining that the logical address of the access request does not fall within any of the plurality of windows.

In some embodiments, the plurality of windows are stored on a different volatile memory with an access time shorter than the access time for the volatile memory storing the first L2P map and the second L2P map. For example, the plurality of windows can be stored in tightly coupled memory (TCM) on the controller.

In some embodiments, a method can include receiving an access request with a logical address for access to data on a flash memory. The flash memory can be communicatively coupled to a flash memory controller to a volatile memory. The volatile memory can be configured to store a first logical address to physical address (L2P) map and a second L2P map, wherein a unit of data pointed to by the first L2P map is smaller than a unit of data pointed to by the second L2P map. The method may further comprise determining that the logical address of the access request falls within at least one of a plurality of windows, and translating the logical address to a physical address associated with the flash memory using the first L2P map. Each window can be a contiguous range of logical addresses.

Some embodiments are directed to a non-volatile memory controller comprising one or more processors configured to implement various methods. Other embodiments are directed to a computer readable medium having stored thereon instructions that when executed by a processor perform several processes.

BRIEF DESCRIPTION OF THE DRAWINGS

FIG. 4 illustrates a table that shows different sizes of the volatile memory based on different configurations of the L2P front map and the L2P back map.

DETAILED DESCRIPTION OF THE INVENTION

Figure 1:
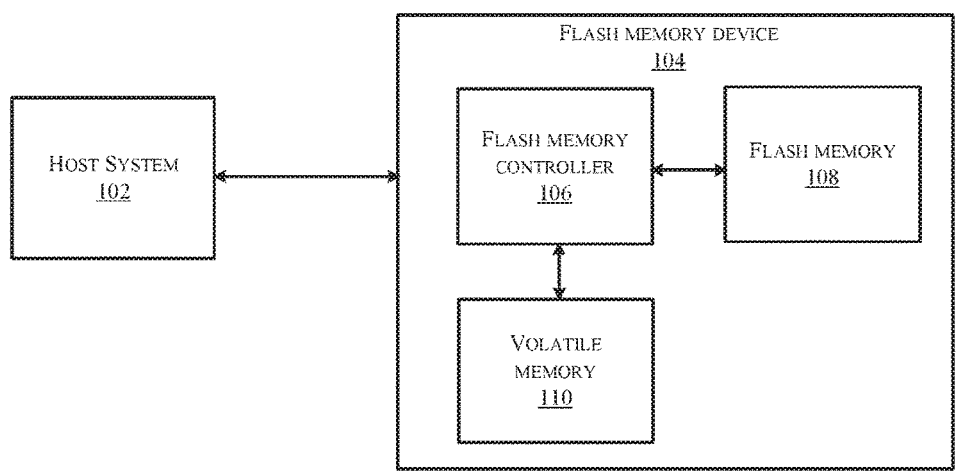
FIG. 1 is a simplified block diagram illustrating a system including a host system coupled to a flash memory device according to some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

Embodiments of the invention pertain to systems, methods, and computer-readable instructions for window based mapping of logical to physical addresses in memory devices. Methods, systems, and computer-readable media as described in the disclosure can be used, for example, in a NAND flash memory device.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

Certain aspects of the disclosure utilize a window based flash translation logic (FTL) approach to reduce the usage of volatile memory (e.g., DRAM) for storing the mapping of logical to physical addresses for access to the flash memory. According to the embodiments, the L2P map can be split into two separate L2P mapping tables, e.g., an L2P front map and an L2P back map, where the L2P front map acts as a window to the back L2P map. In some embodiments, a unit of data pointed to by the L2P front map can be smaller than a unit of data pointed to by the L2P back map. For example, the L2P front map may support smaller granularity (e.g., 4 KB) as compared to the L2P back map (e.g., 16 KB), and thus can allow quick accesses to smaller data sizes. Larger granularity supported by the L2P back map can allow reduction in the space used by the mapping tables in the volatile memory. A window table can keep track of the windows and which map to use for the data accesses. Thus, embodiments can provide reduction in the size of volatile memory generally used to store the L2P maps while maintaining write performances for data accesses inside the window.

Figure 2:
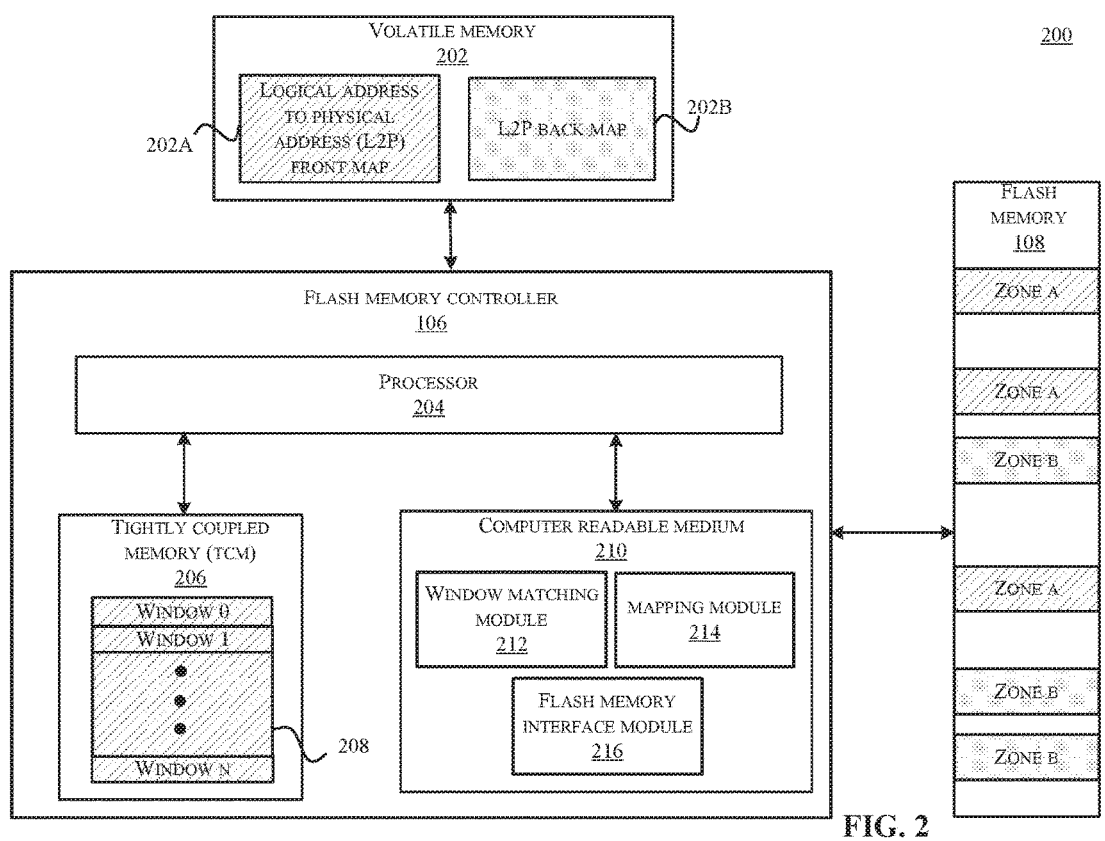
FIG. 2 illustrates a block diagram of the flash memory device, according to some embodiments.
Figure 3:
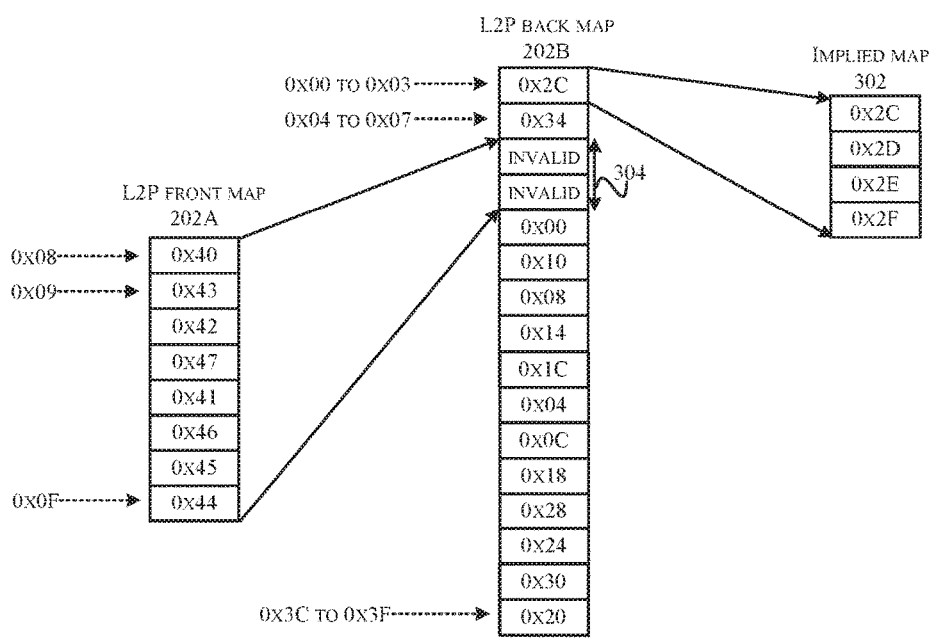
FIG. 3 illustrates an example organization of the L2P front map and L2P back map in one embodiment.
Figure 5:
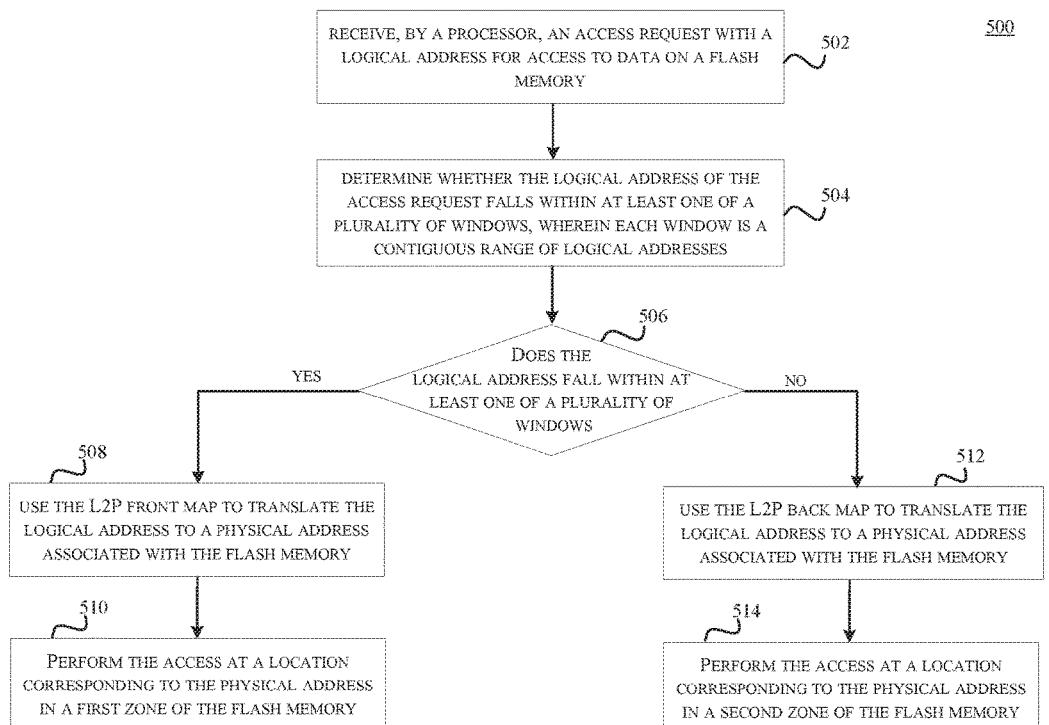
FIG. 5 illustrates a method performed by a flash memory controller in one embodiment.

FIG. 1 is a simplified block diagram illustrating a system including a host system coupled to a flash memory device. FIG. 2 illustrates a block diagram of the flash memory device, according to some embodiments. FIG. 3 illustrates an example organization of the L2P front map and L2P back map in one embodiment. FIG. 4 illustrates a table that shows different sizes of the volatile memory based on different configurations of the L2P front map and the L2P back map. FIG. 5 illustrates a method performed by a flash memory controller in one embodiment.

FIG. 1 is a simplified block diagram illustrating a system 100 including a host system 102 coupled to a flash memory device 104. The flash memory device 104 may include a flash memory controller 106, a flash memory 108, and a volatile memory 110, according to some embodiments. In some implementations, the flash memory 108 can be any non-volatile memory, e.g., a NAND flash. In some implementations, the flash memory 108 can be a NOR flash memory configured to interact externally as a NAND flash. The flash memory 108 can be designed to store data in the absence of a continuous or substantially continuous external power supply. In some examples, the flash memory 108 can be used for secondary data storage, e.g., in a computer system such as a laptop. In such examples, the flash memory device 104 can replace a magnetic hard disk drive (HDD). In some examples, the flash memory controller 106 can be external to the flash memory device 104. In some such examples, the flash memory controller 106 can interact with a plurality of flash memories. In some embodiments, other non-volatile memory can be used in place of or in addition to the flash memory 108. Examples can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

In some implementations, the flash memory 108 may be made up of NAND flash cells. An SLC (single level cell) NAND cell can support one bit per cell, and an MLC (multi-level cell) NAND cell can support two or more bits per cell. Single NAND flash cells that individually store a single bit of 0 or 1 can be joined together in strings and arrays to form much larger data storage structures. These strings can be connected to allow storage and retrieval of data from selected cells. A row of NAND cells can make up a word-line (WL) and is generally the smallest unit to program. A page generally shares the same word-line and can comprise thousands of NAND flash cells. For example, typical page sizes can include 16K, 32K, 64K or 128K NAND cells. A block can include a two-dimensional matrix comprising pages (rows) and strings (columns). For example, block sizes of 8 M bytes are known.

The host system 102 can include any appropriate hardware device, software application, or a combination of hardware and software. In some embodiments, the host system 102 can include a host-side controller (not shown). In some embodiments, the flash memory controller 106 can interface between the host system 102 and the flash memory 108. The flash memory controller 106 can be configured to receive various commands from the host system 102 and interface with the flash memory 108 based on these commands. The flash memory controller 106 can enable the flash memory 108 to perform various operations based on control signals received from the host system 102. In examples, this can enable the host system 102 to program, erase, read, or trim parts of the flash memory 108.

The volatile memory 110 may be communicatively coupled to the flash memory controller 106. The volatile memory 110 may be used in implementation of the Flash Translation Layer (FTL) that maps the host side logical addresses such as "logical block addresses (LBAs)" to the flash memory side "physical addresses" which correspond to physical locations in the flash memory 108. For example, the volatile memory 110 may be used to store translations of the logical to physical addresses for accesses to the flash memory 108. In general, the volatile memory can refer to any memory media where the stored data is lost in the absence of continuous or substantially continuous power supply. For example, the volatile memory 110 may include a dynamic random access memory (DRAM), a Double Data Rate DRAM (DDR DRAM), a Static RAM (SRAM) or any other suitable memory. The logical block address may provide a virtual address from the perspective of the host system 102 for specifying locations of blocks of data physically stored on the flash memory 108. The physical address may provide the actual location of the data in the physical flash memory 108. In some implementations, a flash memory device may utilize a full logical to physical (L2P) map of the flash memory data to map every single LBA to a corresponding physical address. As an example, a 4 GB (four gigabyte) DRAM may be used to map a 4K (four kilobyte) LBA to access a 4 TB (four terabyte) flash drive. Thus, as the capacity of the flash drive increases, size of the DRAM may need to be increased to keep track of the associated map table. The large amount of DRAM can be expensive and also difficult to manage.

In some embodiments, in addition to or instead of an internal volatile memory, the flash memory controller 106 can interface with an external volatile memory. For example, the flash memory controller 106 can have access to an external DRAM where data can be stored before being transferred to a non-volatile memory.

FIG. 2 illustrates a block diagram 200 of the flash memory device 104, according to some embodiments. It is to be noted that the structure shown in FIG. 2 is for illustrative purposes only and the actual physical organization of the flash memory device can differ substantially from the depiction.

In some embodiments, a volatile memory 202 may be used to implement a window based flash translation layer using split maps to reduce the amount of DRAM needed for translation. The volatile memory 202 may include a DRAM, a DDR DRAM, a SRAM or any suitable volatile memory. The volatile memory 202 may be communicatively coupled to the flash memory controller 106. In some implementations, the volatile memory 202 may be part of the flash memory controller 106.

In certain embodiments, the volatile memory 202 may include a logical address to physical address (L2P) front map 202A and an L2P back map 202B to implement the window based flash translation layer. According to the embodiments, the L2P front map 202A may provide a window to the L2P back map 202B. A unit of data pointed to by the L2P front map 202A may be smaller than a unit of data pointed to by the L2P back map 202B. For example, the L2P front map 202A may include a smaller mapping table (e.g., 4 KB or 512 B) and may support a smaller granularity to access small data sizes quickly. Thus, having a smaller L2P front map 202A may provide optimization for write accesses with the same granularity as the L2P front map 202A since read-modify-write may not be needed for those write accesses. The L2P back map 202B may include a larger mapping table (e.g., 8 KB or 16 KB) and may support a larger granularity as compared to the L2P front map 202A. The larger granularity of the L2P back map 202B can allow reduction in the overall size of the volatile memory 202. When a translation needs to be performed, the L2P front map 202A may be checked first for a match. If the translation is not found in the L2P front map 202A, the L2P back map 202B can be checked for a match. In some embodiments, size of the volatile memory 202 may depend on the configuration of the L2P front map 202A and the L2P back map 202B.

In some embodiments, data that needs to be accessed frequently, also called hot data, can be mapped to the L2P front map 202A for quick accesses. For example, the hot data may include data that is accessed a number of times, which is greater than a threshold within a predetermined time period. Data that is not needed frequently, also called cold data, can be mapped to the L2P back map 202B. The cold data may include data that is accessed a number of times, which is equal to or smaller than a threshold within a predetermined time period. For example, data that is accessed more than five times in one minute duration can be called hot data, and data that is accessed five times or less than five times in one minute duration can be called cold data. In some embodiments, the L2P front map 202A map correspond to a first set of flash memory blocks in the flash memory 108 and the L2P back map 202B map correspond to a second set of flash memory blocks in the flash memory 108. The L2P back map 202B being smaller in size can allow the embodiments to utilize a smaller DRAM than typically used by a single FTL mapping table. Thus, the embodiments can allow the use of a smaller volatile memory using split mapping tables with different granularities of data access as compared to a single full mapping table used in the typical FTL approach.

The flash memory 108 may include a plurality of flash memory blocks. For example, a flash memory block can include regions of data. In some embodiments, different zones in the flash memory 108 may indicate corresponding flash memory blocks that can store the data associated with the L2P front map 202A or the L2P back map 202B. For example, a "zone A" may represent a first set of flash memory blocks associated with the L2P front map 202A and a "zone B" may represent a second set of flash memory blocks associated with the L2P back map 202B. In various embodiments, using separate zones for the front map and the back map data may allow efficient garbage collection due to different granularities supported by the L2P front map 202A and the L2P back map 202B. Garbage collection is deployed in many storage systems, such as solid-state disk drives, where there are physical limitations on in-place data update. For example, in some instances, the garbage collection process may select a few blocks with the least number of valid data and copy the valid data of those selected blocks to a free block. Then, garbage collection can erase those selected blocks and assign them to a list of free blocks.

Due to the organization of the flash memory cells, generally, the read and write accesses to a flash memory are page aligned. In instances, when a write access affects only one byte, the whole page has to be updated. A NAND flash page is generally written when it is in a free state. In some implementations, when data on a page is updated, instead of updating the data in-place, a read-modify-write operation can be performed to write the updated data in the free page. The page with the old data can be marked stale and can be erased when a garbage collection process takes place.

The flash memory controller 106 may include a processor 204 communicatively coupled to a tightly coupled memory (TCM) 206 and computer readable medium 210. The processor 204 may be configured to execute instructions stored on the computer-readable storage medium 210, e.g., in the form of a computer program. It will be understood that processing logic of the flash memory controller 106 may be implemented using any suitable circuitry, e.g., Application Specific Integrated Circuit (ASIC), Field Programmable Gate Array (FPGA), or any other circuitry configurable to execute instructions.

The TCM 206 may include a volatile memory that may reside very close to the processor 204 or be tightly coupled to the processor 204. In some embodiments, the TCM 206 may include a fast memory, e.g., a DRAM with a fast access time, e.g., less than one clock cycle. The TCM 206 may include a window table 208 comprising a plurality of windows, e.g., window 0, window 1, . . . , window N. Each window may represent a contiguous range of logical addresses, e.g., a section of the LBA, which may correspond to the L2P front map 202A. The plurality of windows in the window table 208 may include windows with variable sizes. For example, window 0 and window 1 may have different sizes. In some embodiments, for every read or write access request to the flash memory 108, the TCM 206 may be checked to determine if the LBA associated with the access request is located in one of the windows from the window table 208, e.g., window 0, window 1, . . . , window N. In some embodiments, the plurality of windows can be configured during run time. For example, the windows may move based on frequent data accesses to certain logical sections or hot data. It may be desirable to keep the hot data within one of the windows from the window table 208 to allow fast accesses to the flash memory 108 using the L2P front map 202A, and to map the cold data to the L2P back map 202B. Determination of hot data and cold data, and window migration for the hot data and cold data may be implemented using various techniques. Embodiments, as described may be advantageous in combining with other hot/cold accesses algorithms to determine the front map windows.

The computer readable medium 210 may be in the form of a memory. The computer-readable storage medium 210 may be non-transitory. In some embodiments, the computer-readable storage medium 210 may include but is not limited to, SRAM, DRAM, read only memory (ROM), electrically erasable programmable read-only memory (EEPROM), or any other medium which can be used to store the desired information and which can be accessed by the processor 204. In some implementations, the computer readable medium 210 may include a plurality of modules, e.g., a window matching module 212, a mapping module 214 and a flash memory interface module 216.

The window matching module 212 may be configured to determine whether the logical address of an access request falls within at least one of a plurality of windows from the window table 208. For example, the access request may be received by the flash memory controller 106 from the host system 102. The access request may include a write request to write the data at the logical address in the flash memory 108 or a read request to read the data stored at the logical address in the flash memory 108. The window matching module 212 may compare the logical address of the access request with the window 0, window 1, . . . , window N from the window table 208 to determine if the logical address is located in one of the windows. If the logical address is located in one of the windows from the window table 208, the L2P front map 202A can be used for translation of the logical address to a physical address of the flash memory 108. If the logical address is not located in any of the windows from the window table 208, the L2P back map 202B can be used for translation of the logical address to a physical address of the flash memory 108.

The mapping module 214 may be configured to determine a physical address mapped from the logical address using the L2P front map 202A or the L2P back map 202B. The L2P front map 202A may provide the physical address at a smaller granularity (e.g., 4K) and the L2P back map 202B may provide the physical address at a larger granularity (e.g., 16K). The physical address may be used to perform a read or write access at a corresponding physical location of the flash memory 108.

The flash memory interface module 216 may be configured to interface with the flash memory 108 to perform the read or write access to the flash memory 108 based on the access request. For example, the read or write accesses to the flash memory 108 may be performed at a physical location in zone A or zone B corresponding to the physical address obtained from the L2P front map 202A or the L2P back map 202B respectively. Generally, the flash memory 108 may be accessed at the page size granularity. Thus, in some instances, a read-modify-write operation may need to be performed for write accesses with smaller granularity than the page size.

FIG. 3 illustrates an example organization of the L2P front map and L2P back map in one embodiment.

In the embodiments, the L2P front map 202A can have smaller granularity as compared to the L2P back map 202B. For example, in one instance, a unit of data pointed to by the L2P front map 202A can be 4K and a unit of data pointed to by the L2P back map 202B can be 16K. As an example, the L2P front map 202A may include logical to physical address mapping for an LBA window of 0x08 to 0x0F. As shown in FIG. 3, an LBA "0x08" maps to a physical address "0x40", an LBA "0x09" maps to a physical address "0x43", and an LBA "0x0F" maps to a physical address "0x44" of the flash memory 108, e.g., in one of the zones "A."

In L2P back map 202B, each entry may point to the first of multiple 4K pages that are sequentially stored. Note that based on the configuration of the flash memory 108, granularity of the L2P back map 202B or an access size for each entry of the L2P back map 202B can be 4K, 8K, 16K, etc. In some embodiments, the granularity selected for the L2P back map 202B may be same as the page size of a block in the flash memory 108. As illustrated in FIG. 3, the example L2P back map 202B may include a single logical to physical address mapping for a contiguous LBA range 0x00 to 0x3F. Since, in this example, the mapping unit for the L2P back map 202B is 16K, an index for the L2P back map 202B may have to convert from a 4K LBA to a 16K LBA. The physical address may still be based on the size of the L2P front map 202A. For example, the last two bits of the physical address may always be zero. In some embodiments, the L2P back map 202B may include an implied map 302. A unit of data pointed to by the implied map 302 may be same as the unit of data pointed to by the L2P front map 202A (e.g., 4K). For example, LBA "0x00" to "0x03" maps to a physical address "0x2C" which may correspond to implied physical addresses "0x2C", "0x2D", "0x2E" and "0x2F" of the flash memory 108, e.g., in one of the zones "B", based on the implied map 302. Similarly, LBA "0x04" to "0x07" maps to an implied physical address "0x34", and LBA "0x3C" to "0x3F" maps to an implied physical address "0x20" of the flash memory 108, e.g., in one of the zones "B."

As discussed previously, the L2P front map 202A may correspond to a section of the L2P back map 202B, e.g., a section 304 as illustrated in FIG. 3. The section 304 indicates invalid mapping since the mapping for those LBA is already located in the L2P front map 202A. If the current LBA is found in one of the windows from the window table 208 in the TCM 206, the corresponding physical address can be determined from the L2P front map 202A. If the current LBA is not found in one of the windows from the window table 208 in the TCM 206, the corresponding physical address can be determined from the L2P back map 202B.

A read or write access request with the same size as the granularity of the L2P front map 202A (e.g., 4K) can be performed quickly and thus are optimal. Read access requests that land in the L2P back map 202B may read the data in 16K units. However, for write access requests that land in the L2P back map 202B may need to perform read-modify-write for write accesses that are smaller than 16K. For example, referring back to FIG. 3, a write access at the address 0x2 in the L2P back map 202B, may first need to read data in 16K page unit, e.g., from 0x2C, 0x2D, 0x2E and 0x2F, and then modify the data only for the address 0x2, e.g., 0x2E.

In some embodiments, configurations of the L2P front map 202A and the L2P back map 202B may determine the size of the volatile memory 202. As an example, for an eight terabyte (8 TB) solid state drive, size of the volatile memory 202 for different configurations of the L2P front map 202A and the L2P back map 202B can be calculated as discussed below with reference to FIG. 4.

FIG. 4 illustrates a table 400 that shows different sizes of the volatile memory 202 based on different configurations of the L2P front map 202A and the L2P back map 202B.

The table 400 illustrates a mapping configuration 402, a calculated memory size 404 and a total memory size 406. The mapping configuration 402 may represent different mapping configurations 402A, 402B, 402C, 402D and 402E for a given flash memory drive based on a size of the L2P back map 202B, number of windows in the L2P front map 202A and the size of each window. The calculated memory size 404 may represent calculated volatile memory size for both the L2P front map 202A and the L2P back map 202B. Please note that the calculated memory size 404 may include error correction code (ECC) bits. For example, in some embodiments, including 9/8 ECC may increase the memory size by approximately 12.5%. The total memory size 406 may represent a size of the volatile memory 202 to implement the given configuration of the L2P front map 202A and the L2P back map 202B.

The mapping configuration 402A may correspond to a full 4K mapping that does not include split maps (e.g., the L2P front map 202A and the L2P back map 202B). With the 4K mapping, number of entries supported by the 8 TB drive can be calculated as two gigabytes (e.g., 8 TB/4 KB=$2^{43}$/$2^{12}$=$2^{31}$=2 GB). As an example, if size of each entry is 4.5 bytes (4.5 B), the total memory size 406 for the volatile memory 202 using the 4K mapping may be nine gigabytes (e.g., 2 GB×4.5 B=9 GB).

The mapping configuration 402B may correspond to an 8K L2P back map 202B and two windows for L2P front map 202A with each window size being 64 GB. With the 8K mapping, number of entries supported by the L2P back map 202B for the 8 TB drive can be calculated as one gigabyte (e.g., 8 TB/8 KB=$2^{43}$/$2^{13}$=$2^{30}$=1 GB). Therefore, with each entry size being 4.5 B, an approximate size of the L2P back map 202B can be calculated to be 4.5 GB (e.g., 1 GB×4.5 B). Further, with a window size of 64 GB and 4K mapping unit, number of entries supported by the L2P front map 202A can be calculated as 16 MB (e.g., 64 GB/4 KB=$2^{36}$/$2^{12}$=$2^{24}$=16 MB). With each entry size being 4.5 B, an approximate size for one window can be calculated as 72 MB (e.g., 16 MB×4.5 B). Therefore, for two windows, the memory size needed for the L2P front map 202A can be calculated to be 144 MB (e.g., 2×72 MB). Thus, the calculated memory size 404 may be 4.5 GB+144 MB and the total memory size 406 for the volatile memory 202 may be 4.6 GB using the mapping configuration 402B.

Hence, in certain embodiments, the space needed to store the mapping table, as represented by the total memory size 406, can be reduced by almost fifty percent by doubling the granularity of the L2P back map 202B. For example, as shown in the table 400, the total memory size 406 using the L2P back map 202B with 8 KB granularity is almost half (e.g., 4.6 GB) as compared to the total memory size 406 using the full 4 KB mapping (e.g., 9 GB). In addition, maintaining the hot pages in the L2P front map 202A can still allow for fast accesses for most of the page accesses.

The mapping configuration 402C may correspond to an 8K L2P back map 202B and ten windows for L2P front map 202A with each window size being 128 GB. Using similar calculations as described above for the mapping configuration 402B, the calculated memory size 404 for the L2P back map 202B may be 4.5 GB and for the L2P front map 202A may be 1.46 GB. Based on the calculated memory size 404, the total memory size 406 for the volatile memory 202 for the mapping configuration 402C may be 6.0 GB.

The mapping configuration 402D may correspond to an 16 KB L2P back map 202B and ten windows for L2P front map 202A with each window size being 64 GB. Using similar calculations as described above for the mapping configuration 402B, the calculated memory size 404 for the L2P back map 202B may be 2.25 GB and for the L2P front map 202A may be 720 MB. Based on the calculated memory size 404, the total memory size 406 for the volatile memory 202 for the mapping configuration 402D may be 3.0 GB.

The mapping configuration 402E may correspond to an 16 KB L2P back map 202B and ten windows for L2P front map 202A with each window size being 128 GB. Using similar calculations as described above for the mapping configuration 402B, the calculated memory size 404 for the L2P back map 202B may be 2.25 GB and for the L2P front map 202A may be 1.46 GB. Based on the calculated memory size 404, the total memory size 406 for the volatile memory 202 for the mapping configuration 402E may be 4.7 GB.

As discussed with reference to the table 400, in various embodiments, for different mapping configurations, the total memory size 406 can be reduced using the L2P front map 202A and the L2P back map 202B. For example, the total memory size 406 for the mapping configurations 402B, 402C, 402D and 402E that include the front map and the back map is smaller than the mapping configuration 402A that includes full mapping.

FIG. 5 illustrates a method 500 to determine if the L2P front map 202A or the L2P back map 202B can be used to perform the address translation, in one embodiment. For example, the method 500 may be performed by the flash memory controller 106, as discussed with reference to FIG. 2.

In step 502, the processor 204 may receive an access request with a logical address for access to data on the flash memory 108. For example, the access request may be received from the host system 102 for a read access or a write access to the flash memory 108.

In step 504, the processor 204 may determine whether the logical address of the access request falls within at least one of a plurality of windows. Each window from the plurality of windows may include a continuous range of logical addresses. Referring back to FIG. 2, the window matching module 212 may determine if the logical address of the access request falls within at least one of the windows from the window table 208, e.g., window 0, window 1, . . . , or window N. For example, referring back to FIG. 3, the window matching module 212 may determine that the logical address with the access request equal to "0x09" falls within the window "0x08" to "0x0F."

In step 506, the processor 204 may determine if the L2P front map 202A or the L2P back map 202B may be used to translate the logical address to a physical address associated with the flash memory 108 based on whether the logical address of the access request falls within at least one of a plurality of windows from the window table 208. The window table 208 resides in the TCM 206 that may be located close to the processor 204 to provide a fast access time.

In step 508, the L2P front map 202A may be used to translate the logical address to a physical address associated with the flash memory 108 if the logical address of the access request falls within at least one of the windows from the window table 208. For example, the mapping module 214 may access the L2P front map 202A to determine a physical address corresponding to the logical address provided with the access request. The physical address may be used to access the data in the flash memory 108. For example, referring back to FIG. 3, for the logical address equal to "0x09", the physical address equal to "0x43" may be determined from the L2P front map 202A. In some instances, the data mapped by the L2P front map 202A may include hot data, e.g., data that may be accessed frequently within a certain time period.

In step 510, the processor 204 may perform the access at a location corresponding to the physical address in a first zone of the flash memory. For example, the processor 204 may access the flash memory in zone A at a location corresponding to the physical address obtained from the L2P front map 202A. As discussed previously, flash memory data may have been categorized into separate zones A and B for efficient garbage collection process. In some embodiments, data accessed using the L2P front map 202A may be located in one of the zone A of the flash memory 108. The access request may include a read access of the flash memory 108 or a write access to the flash memory 108 at the physical location. Referring back to the previous example, the flash memory interface module 216 may perform a read or write access to the physical address "0x43" of the flash memory 108. Hence, accesses to the flash memory 108 using the L2P front map 202A may provide optimal performance since the data can be accessed at a smaller granularity. The data accessed using the L2P front map 202A may allow the flash memory device 104 to function with a performance that may be similar to a fully mapped flash memory device (e.g., without split maps).

In step 512, the L2P back map 202B may be used to translate the logical address to a physical address associated with the flash memory 108 if the logical address of the access request doesn't fall within at least one of the windows from the window table 208. For example, if the logical address of the access request is "0x02", the L2P back map 202B may be used instead of the L2P front map 202A. Referring back to FIG. 2, the mapping module 214 may access the L2P back map 202B to determine a physical address corresponding to the logical address provided with the access request. For example, referring back to FIG. 3, if the logical address equals to "0x02", the L2P back map 202B may be used to determine the corresponding physical address. In one embodiment, as an example, data may be read at 16K granularity from the L2P back map 202B for the logical address equal to "0x02", e.g., "0x2C", "0x2D", "0x2E", and "0x2F." Using the implied map 302, the physical address equal to "0x2E" may be determined from the L2P back map 202B for the logical address "0x02." However, for a write access, a read-modify-write operation may need to be performed. For example, the data may be read at 16K granularity and a write operation at 4K granularity (e.g., corresponding to "0x2E") may be performed. In some instances, the data mapped by the L2P back map 202B may include cold data, e.g., data that may not be accessed frequently within a certain time period.

In step 514, the processor 204 may perform the access at a location corresponding to the physical address in a second zone of the flash memory. For example, the processor 204 may access the flash memory in zone B at a location corresponding to the physical address obtained from the L2P back map 202B. As discussed previously, data accessed using the L2P back map 202B may be located in one of the zone B of the flash memory 108 for efficient garbage collection process. The access request may include a read access of the flash memory 108 or a write access to the flash memory 108 using the physical address. Referring back to the previous example, the flash memory interface module 216 may perform a read or write access to a location corresponding to the physical address "0x2E" of the flash memory 108.

As discussed using FIGS. 2-5, embodiments can provide reduction in the size of the volatile memory used to implement window based flash translation layer by making use of a L2P front map and a L2P back map. The L2P front map may be a smaller map in size with a smaller granularity for the entries. The L2P back map can have larger granularity to provide reduction in the overall size of the volatile memory. The data accessed in the L2P front map can allow the flash drive to function with relatively same performance as a fully mapped drive. The L2P back map may require execution of a read-modify-write to the flash memory if the data written is of smaller granularity than the L2P back map.

What is claimed is:

1. A flash memory device comprising:
    a flash memory;
    a volatile memory configured to store a first logical address to physical address (L2P) map and a second L2P map, wherein a unit of data pointed to by the first L2P map is smaller than a unit of data pointed to by the second L2P map, and wherein a total map size in the volatile memory is based on a size of the first L2P map and a size of the second L2P map in the volatile memory; and
    a controller configured to:
        receive an access request with a logical address for access to data on the flash memory;
        compare the logical address of the access request with a plurality of windows of a window table, wherein each window is a contiguous range of logical addresses between a start address and an end address, and wherein the size of the first L2P map in the volatile memory is based on a number of windows and a size of a respective window in the plurality of windows;
        determine whether the logical address of the access request is located between a first start address and a first end address associated with at least one of the plurality of windows of the window table; and
        upon determining that the logical address of the access request is located between the first start address and the first end address associated with the at least one window of the plurality of windows, use the first L2P map stored in the volatile memory to address to a physical address associated with the flash memory, wherein an ordering of physical addresses addressed to by the first L2P map differs from an ordering of corresponding logical addresses in the first L2P map.

2. The flash memory device of claim 1, wherein upon determining that the logical address of the access request is not located between a respective start address and a respective end address associated with any of the plurality of windows, the controller is further configured to use the second L2P map stored in the volatile memory to translate the logical address to the physical address associated with the flash memory.

3. The flash memory device of claim 1, wherein the window table comprising the plurality of windows is stored on a different volatile memory with an access time shorter than the access time for the volatile memory storing the first L2P map and the second L2P map.

4. The flash memory device of claim 1, wherein:
    the window table comprising the plurality of windows is stored in tightly coupled memory (TCM) on the controller; and
    determining whether the logical address is located between the first start address and the first end address comprises reading at least the first start address and the first end address from the TCM.

5. The flash memory device of claim 1, wherein the plurality of windows include windows with variable sizes.

6. The flash memory device of claim 1, wherein the flash memory comprises a plurality of flash memory blocks, wherein the first L2P map corresponds to a first set of flash memory blocks and the second L2P map corresponds to a second set of flash memory blocks from the plurality of flash memory blocks.

7. The flash memory device of claim 1, wherein the data associated with the first L2P map includes data that is accessed a number of times within a predetermined time period and wherein the number of times is greater than a threshold.

8. The flash memory device of claim 1, wherein the data associated with the second L2P map includes data that is accessed a number of times within a predetermined time period and wherein the number of times is smaller than a threshold.

9. The flash memory device of claim 1, wherein the first L2P map represents a window of a certain contiguous range of logical addresses corresponding to an implied map associated with the second L2P map, wherein the implied map points to a unit of data equal to the unit of data pointed to by the first L2P map.

10. The flash memory device of claim 1, wherein the controller is further configured to move the at least one window in the plurality of windows;
    moving the at least one window involves changing a corresponding start address in the window table to a second start address different from the first start address and/or changing a corresponding end address in the window table to a second end address different from the first end address, during run time based on a frequency of data accesses of addresses within the windows; and
    a second lookup in the window table for a second logical address between the first start address and the first end address results in the second logical address not found.

11. The flash memory device of claim 1, wherein the volatile memory is a dynamic random access memory (DRAM).

12. The flash memory device of claim 10, wherein:
    moving the at least one window during run time based on the frequency of data accesses of addresses further comprises moving the at least one window in response to a third logical address located between the first start address and the first end address being accessed less than a threshold frequency; and
    the controller is further configured, responsive to the second logical address not being found in the window table during the second lookup, to use the second L2P map stored in the volatile memory to translate the second logical address to a second physical address associated with the flash memory.

13. The flash memory device of claim 10, wherein, responsive to the at least one window being moved, the first L2P map is modified to map logical addresses between the second start address and the second end address to physical addresses.

14. A method comprising:
receiving, by a flash memory controller, an access request with a logical address for access to data on a flash memory, the flash memory communicatively coupled to the flash memory controller and to a volatile memory, wherein the volatile memory is configured to store a first logical address to physical address (L2P) map and a second L2P map, wherein a unit of data pointed to by the first L2P map is smaller than a unit of data pointed to by the second L2P map, and wherein a total map size in the volatile memory is based on a size of the first L2P map and a size of the second L2P map in the volatile memory;
comparing the logical address of the access request with a plurality of windows of a window table, wherein each window is a contiguous range of logical addresses between a start address and an end address, and wherein the size of the first L2P map in the volatile memory is based on a number of windows and a size of a respective window in the plurality of windows;
determining that the logical address of the access request is located between a first start address and a first end address associated with at least one of the plurality of windows of the window table; and
translating the logical address to a physical address associated with the flash memory using the first L2P map stored in the volatile memory, wherein an ordering of physical addresses addressed to by the first L2P map differs from an ordering of corresponding logical addresses in the first L2P map.

15. The method of claim 14, wherein the second L2P map stored in the volatile memory is used to translate the logical address to the physical address associated with the flash memory if the logical address of the access request is not located between a respective start address and a respective end address associated with any of the plurality of windows.

16. The method of claim 14, wherein the window table comprising the plurality of windows is stored in tightly coupled memory (TCM) on the flash memory controller; and determining that the logical address is located within at least one of the plurality of windows comprises reading at least the first start address and the first end address from the TCM.

17. The method of claim 14, wherein the access request includes a request to perform a read or a write of the flash memory at the logical address.

18. A non-transitory computer readable medium having stored thereon instructions that, when executed by a processor, perform a method, comprising:
receiving an access request with a logical address for access to data on a flash memory, the flash memory communicatively coupled to the processor and to a volatile memory, wherein the volatile memory is configured to store a first logical address to physical address (L2P) map and a second L2P map, wherein a unit of data pointed to by the first L2P map is smaller than a unit of data pointed to by the second L2P map, and wherein a total map size in the volatile memory is based on a size of the first L2P map and a size of the second L2P map in the volatile memory;
comparing the logical address of the access request with a plurality of windows of a window table, wherein each window is a contiguous range of logical addresses between a start address and an end address, and wherein the size of the first L2P map in the volatile memory is based on a number of windows and a size of a respective window in the plurality of windows;
determining that the logical address of the access request is located between a first start address and a first end address associated with at least one of the plurality of windows of the window table; and
translating the logical address to a physical address associated with the flash memory using the first L2P map stored in the volatile memory, wherein an ordering of physical addresses addressed to by the first L2P map differs from an ordering of corresponding logical addresses in the first L2P map.

19. The non-transitory computer readable medium of claim 18, wherein the second L2P map stored in the volatile memory is used to translate the logical address to the physical address associated with the flash memory if the logical address of the access request is not located between a respective start address and a respective end address associated with any of the plurality of windows.

20. The non-transitory computer readable medium of claim 18, wherein the processor is part of a flash memory controller.

* * * * *